No. 853,345. PATENTED MAY 14, 1907.
J. R. DUNCAN.
APPARATUS FOR EXTRACTING MOISTURE FROM COMPRESSED AIR.
APPLICATION FILED OCT. 13, 1904.
4 SHEETS—SHEET 1.
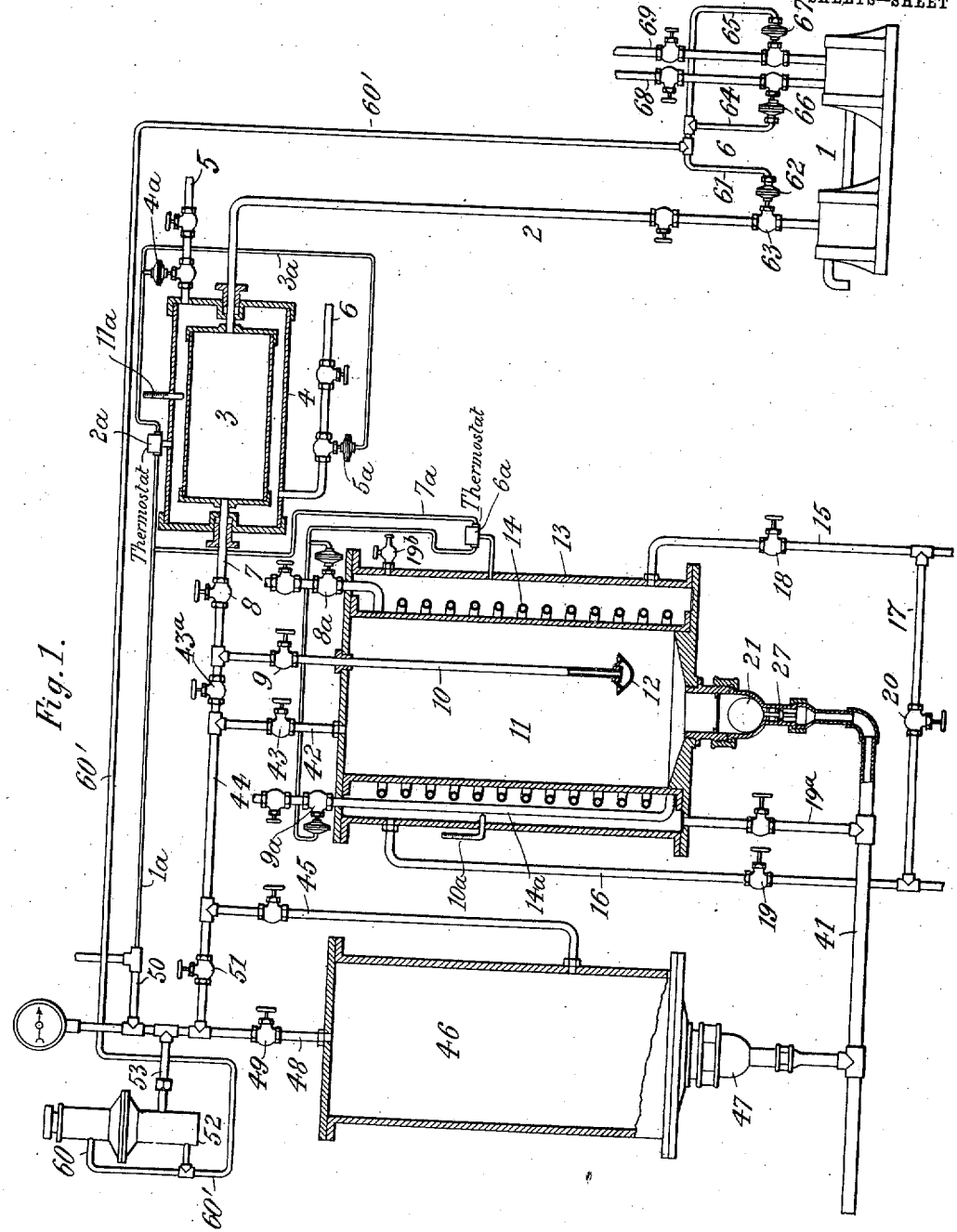
Witnesses:
Thomas J. Byrnes.
A. S. Dunham.
Inventor:
James R. Duncan
by Kerr, Page & Cooper Att'ys No. 853,345. PATENTED MAY 14, 1907.
J. R. DUNCAN.
APPARATUS FOR EXTRACTING MOISTURE FROM COMPRESSED AIR.
APPLICATION FILED OCT. 13, 1904.
4 SHEETS—SHEET 2.
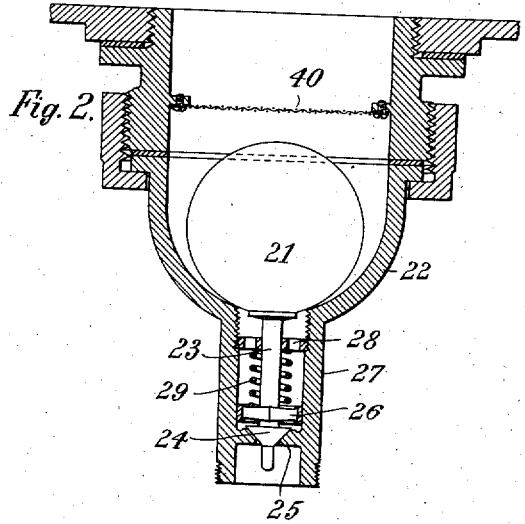
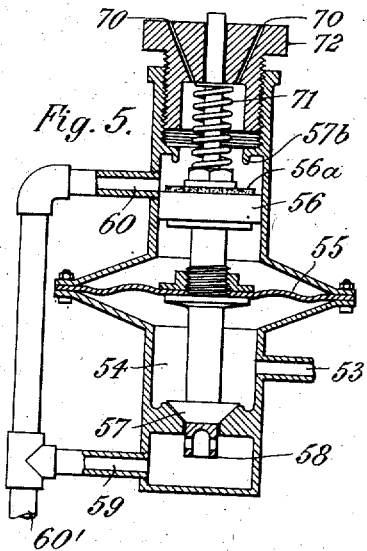
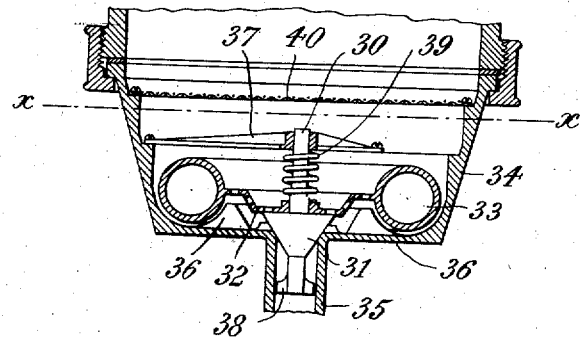
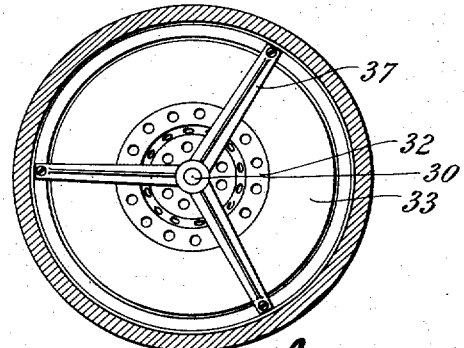
Witnesses:
Thomas J. Byrnes
S. S. Dunham
Inventor:
James R. Duncan
by Kerr, Page & Cooper Attys

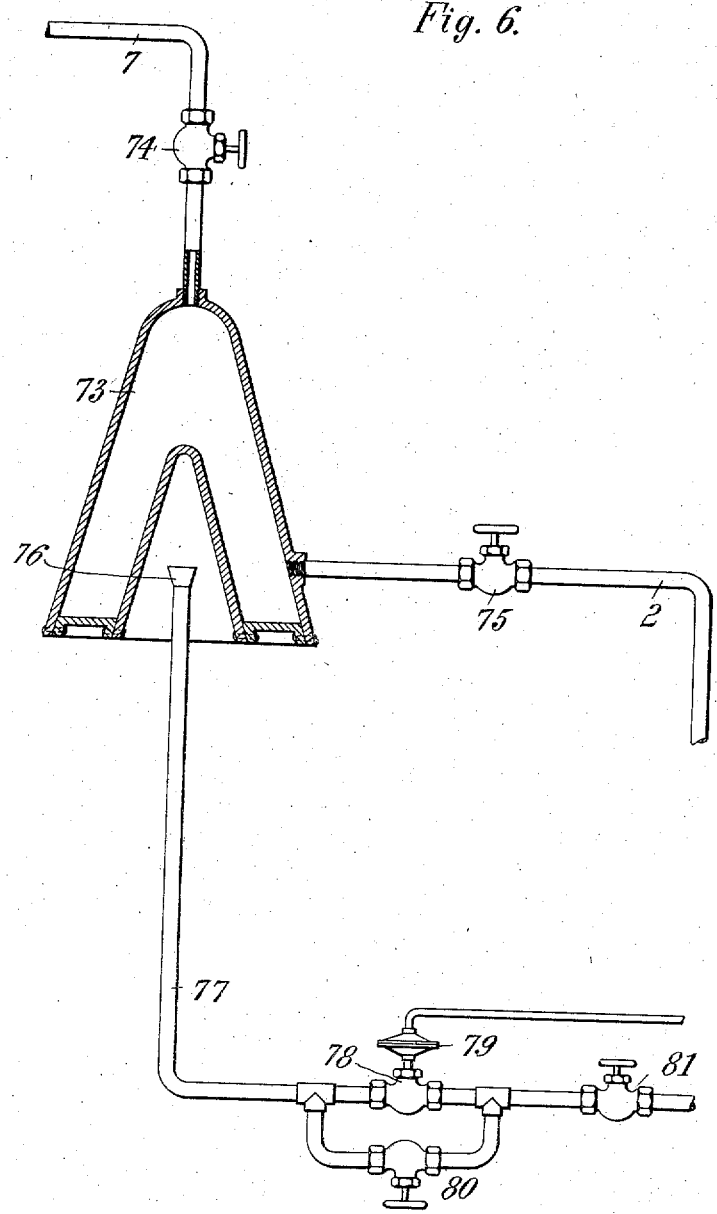

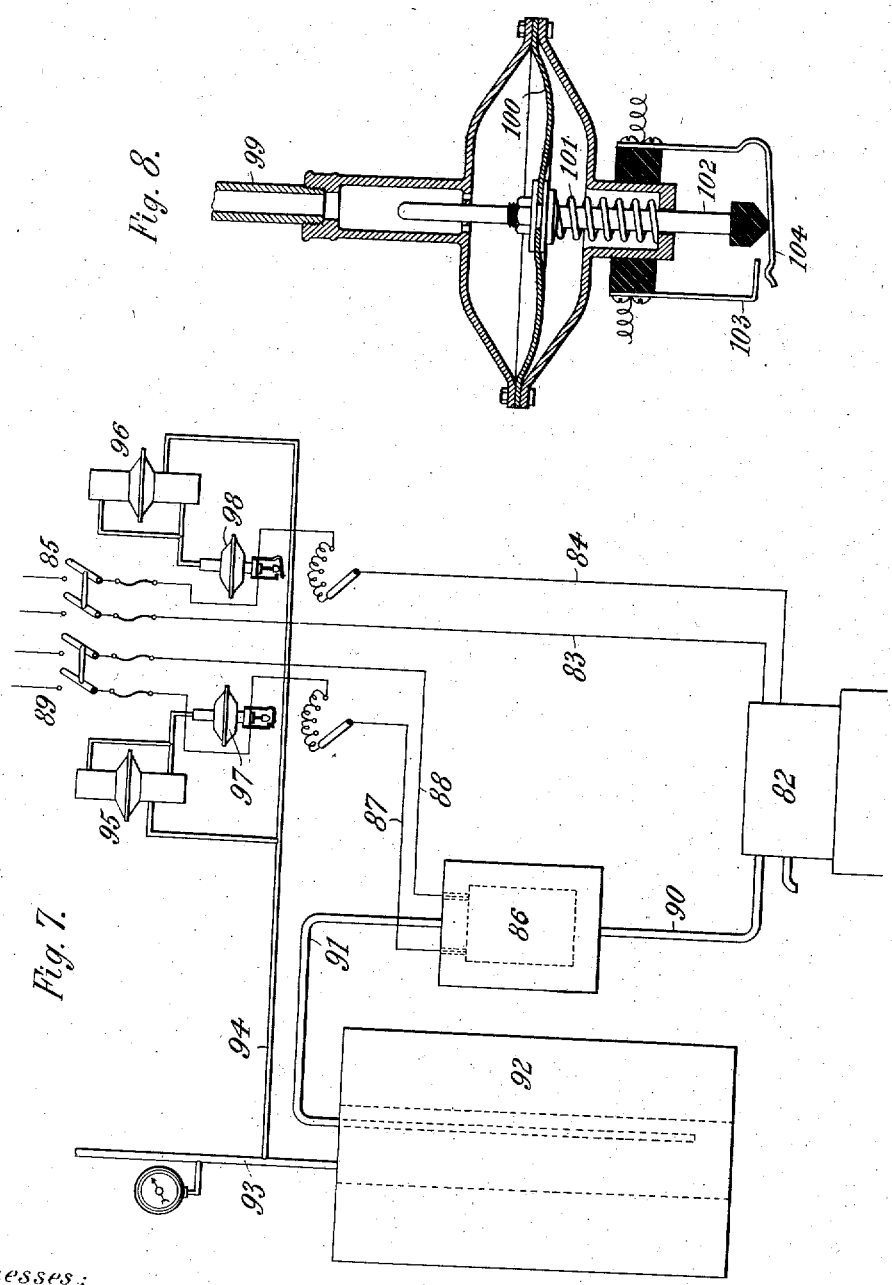

UNITED STATES PATENT OFFICE.

JAMES R. DUNCAN, OF NEW YORK, N. Y.

APPARATUS FOR EXTRACTING MOISTURE FROM COMPRESSED AIR.

No. 853,345.      Specification of Letters Patent.      Patented May 14, 1907.

Application filed October 13, 1904. Serial No. 228,296.

*To all whom it may concern:*

Be it known that I, JAMES R. DUNCAN, a citizen of the United States, residing at New York, in the county and State of New York, have invented certain new and useful Improvements in Apparatus for Extracting Moisture from Compressed Air and other Gases, of which the following is a specification, reference being had to the drawings accompanying and forming part of the same.

One of the most serious drawbacks encountered in the use of compressed air as a motive fluid for operating tools and other devices is the presence of moisture in the air, which condenses and collects in the utilizing devices and seriously interferes with their operation. In the case of pneumatic tools and other apparatus employed out of doors, as in the erection of buildings, work on vessels in dry dock, etc., this trouble is greatly aggravated in the winter, since in severe weather it frequently happens that the water collected in the tools freezes and thus renders them useless until thawed out. They may soon freeze up again, however, thus resulting in annoyance and loss of time. Such annoyance may be very great and widespread, as in the case of a railroad using pneumatic switch-operating devices. The freezing of moisture in the operating mechanism locks the switch and interferes with or entirely prevents the proper transfer of trains, and may even result in disastrous wrecks. Heating the mechanism to melt the ice is at best a tedious and troublesome operation. Furthermore, it does not prevent the device from freezing up again when the heat is no longer applied.

Even where there can be no freezing the presence of the water is a disadvantage, since it may cause the operative parts of the tool or other device to rust, and cause the apparatus to deteriorate. Such drawbacks can be eliminated only by the use of dry air, and I have therefore been led to devise my present invention, which has for its object to provide an apparatus by which the moisture may be quickly, easily, and cheaply extracted from compressed air or other gas. To these ends the invention consists of the novel features, arrangements of parts, and combinations of elements hereinafter described, and more particularly pointed out in the claims.

In carrying out my invention I cool the compressed air, and thus condense the water vapor which is present therein, causing the water thus formed to be precipitated in a closed chamber, leaving the air dry. While it is true, as a general proposition, that the vapor of water will condense at a certain temperature under a given pressure, I have nevertheless found that more moisture can be removed by heating the air before cooling it, thus indicating that more or less moisture is retained in air which is not heated before being chilled. I am unable to explain this with certainty, but it may be that, while all the moisture may condense whether the air has first been heated or not, the considerable drop in temperature, which occurs when the air is heated and then immediately cooled, in some way facilitates the coalescence of the minute particles into larger drops and thus causes a greater or more rapid precipitation. If the particles do not coalesce into drops they may remain suspended in the air and be carried on out of the cooling chamber. But be that as it may, my tests have shown that it is advisable to raise the temperature of the air a few degrees before subjecting it to the cooling agent.

Referring now to the drawings for a more complete understanding of my invention, Figure 1 is a diagrammatic view showing a convenient embodiment of the invention. Figs. 2 and 3 are detail sectional views showing two forms of float valve for automatically charging water from the cooling and collecting chamber. Fig. 4 is a section on line $x$—$x$. Fig. 3. Fig. 5 is a detail view in section, showing a novel form of pressure regulating valve which I employ in connection with my system, for keeping the pressure of the air therein constant. Fig. 6 shows diagrammatically a modification of the system shown in Fig. 1, in which gas is used as a fuel for heating the air, with devices for automatically cutting off the supply of fuel when the supply of compressed air is cut off. Fig. 7 is a system in which electricity is employed to compress and heat the air, with novel devices whereby the pressure of the air and the heating of the same are controlled automatically. Fig. 8 is a view showing in detail one of the devices for stopping the compressor and cutting off the current to the heater when the pressure of the air exceeds a predetermined limit.

Referring to Fig. 1, the air is delivered from any suitable compressor 1, by a pipe 2, to a heating chamber 3. This latter is inclosed within a casing 4, leaving a space between the two as shown, into which a heating medium, such as steam or hot water, is admitted by a pipe 5 connected with a source of supply not shown, and discharged through the pipe 6. Waste steam from a heating or power plant may be conveniently used for such purpose. From the chamber 3, wherein the air is heated, it is carried by the pipe 7, through valves 8 and 9, the valve 9$^a$ being closed, to the discharge pipe 10, from which it issues into the cooling chamber 11. The discharge pipe 10 is preferably provided with a spreader, as the inverted cone 12 placed over the mouth of the pipe, so that the air as it is discharged will be quickly and thoroughly diffused throughout the chamber and therefore readily cooled. Around the chamber 10 is a casing 13, leaving a space between the two for the circulation of a suitable cooling agent. Various means may be used to effect the absorption of heat from the air in the chamber 10, as for example a coiled pipe 14, through which ammonia or other refrigerating agent may be passed. I prefer, however, to use water as the cooling agent, and for this purpse I provide a pipe 15, connected to the lower part of the casing, and to a source of supply not shown. By connecting the pipe to the lower part of the casing the inflow will keep the water therein constantly agitated in that part, and so prevent the deposit of sediment. After passing through the cooling space the water is discharged through a pipe 16. The latter may be connected to the pipe 15, by a by-pass 17, the three pipes being provided with valves 18, 19, and 20. By closing valves 18 and 19, and opening valve 20, the cooling apparatus will be cut out of the water supply system, as will be readily understood. The valve pipe 19$^a$ is for the purpose of draining the cooling space of its contents, when desired, a petcock 19$^b$ being provided in the outer casing to admit air thereto.

As the moisture is precipitated in the cooling chamber it collects in the bottom of the same, from which it may be drawn off from time to time as desired. For the purpose of discharging the collected moisture automatically at suitable intervals I employ a float valve which is normally closed but which is raised when a sufficient quantity of water has accumulated to lift the float. Various automatic valves might be used for that purpose. I prefer one or the other of the novel forms shown in Figs. 2, 3, and 4. In Fig. 2, the float, indicated by 21, is spherical and is located in a casing 22 of corresponding shape. Depending from the float is a stem 23, carrying a conical plug 24, fitting a seat in the diaphragm 25. To insure the proper seating of the valve plug the stem may be provided with a guide ring, 26, freely movable in the tubular extension 27 of the valve chamber, and may also pass through a central opening in a spider 28 located in the upper end of the said tubular extension. It will now be seen that when sufficient water has collected in the chamber 22 the float 21 will be raised, lifting the plug 24 and permitting the water to flow out, whereupon the valve closes immediately and prevents any appreciable amount of the air in the chamber 11 from escaping. Besides being held in its seat by its own weight and the weight of the connected parts, the valve will be held down by the pressure of the air above it, with the result that a greater quantity of water must collect before the valve will be opened. If the pressure in the chamber 11 is low the valve may open too frequently, but in that case it may be provided with a spring 29, to hold it more firmly in its seat, as will be readily understood. Usually, however, the spring will not be found necessary. In the form shown in Figs. 3 and 4, the valve stem 30 and plug 31 are carried by a perforated disk 32, which is in turn carried by a tubular ring 33, resting in an annular depression in the valve chamber 34. The annular depression is connected with the tubular extension 35 by suitable passages, as 36. To insure proper seating of the valve the stem at its upper end is mounted in a central opening in a guide or spider 37, and at its lower end is provided with studs or vanes 38, which bear on the inner surface of the tubular extension 35. The valve is thus made to move always in the same vertical line. If it is desired to increase the pressure which holds the plug 31 in its seat a spring 39 may be used between the guide 37 and the disk 32, as shown. In order to protect the valve from foreign matter carried in to the chamber 11 by the air, which might lodge in the valve seat and so interfere with the proper fit of the plug, a screen 40 may be located over the float to prevent such matter from entering the valve chamber.

The outlet valve of the chamber 11 may discharge at any convenient place, as into a receptacle, or into a waste pipe 41.

Passing from the cooling chamber by pipe 42, valve 43, and pipe 44, the air is admitted through a valved pipe 45 into a chamber 46, which serves both as a supplemental cooling chamber and a storage reservoir or tank. It may sometimes happen that some of the particles of water condensed in the main cooling chamber 11 are not precipitated, as might result from a variety of causes, such as a considerable increase in the temperature of the chamber, but are carried out of the chamber by the outgoing air. In that case the particles will have further opportunity to coalesce in the reservoir 46. By this means the last appreciable amount of moisture may be extracted. The water collected in the reservoir may be discharged by an automatic valve in the casing 47, as in the case of the main-cooling chamber, 11, into the same waste pipe 41.

From the reservoir 46 the air is delivered by a pipe 48, valve 49, and pipe 50 to the point of utilization.

It will be noted that by the proper use of the various valves in the apparatus any one or all of its parts may be put out of operation. For example, if it is not desired to heat the air, the supply of steam to the jacket 4 may be cut off; the cooling chamber may be disconnected by closing the valves 9 and 43 and opening valve 43$^a$; and the tank 46 may be cut off by closing the valves in the pipes 45 and 48, and opening the valve 51.

For the purpose of keeping the pressure of the air substantially constant I employ a governor 52, so connected with the compressing apparatus that increase of pressure above a predetermined limit will cause the compressor to be stopped, or its operation checked, until the pressure falls to normal or below, whereupon the compressor is made to resume its normal operation. A variety of governing devices might be employed for this purpose, but I prefer to use the novel devices shown in Fig. 5. The air is admitted through a pipe 53 into the diaphragm chamber 54. When the pressure in this chamber rises above the given limit the diaphragm 55 is raised, carrying with it the valve disk 56 and plug 57. The latter is provided with a hollow extension 58, provided with lateral openings, as shown, so that the valve stem must rise until the apertures are covered by the lower edge of the valve seat, before air will be admitted from the chamber 54 into the pipe 59. Before the air is thus admitted, however, the disk 56 has already closed the pipe 60, so that the air is compelled to flow back along the pipe 60'. The latter terminates in three branches. The first branch, 61, is connected with a device 62 which is operated by the pressure in the pipe to actuate the valve 63 and cut off the supply of compressed air through the pipe 2; the other branches, 64 and 65, are equipped with similar valve mechanisms, 66, 67, which cut off or reduce the power to the compressor through the pipes 68, 69; thus stopping the compressor or reducing its output. Such valve operating devices are well known, and any convenient form may be used for the purpose.

When the pressure in the reservoir 46 has fallen to or below normal the diaphragm 55 will fall, closing the valve 57 and opening the pipe 60, whereupon the air under pressure in the pipe 60' passes out through the pipe 60 and passages 70 to the atmosphere, thus fully relieving the pressure on the valve operating devices 62, 66, and 67, and restoring the entire system to its original condition. The disk 56 is provided with a yielding face 56$^a$, which seats firmly against the annular seat 57$^b$, preventing any escape of air through the passages 70 before the pressure in the system has been relieved sufficiently to permit the diaphragm 55 to fall. The pressure at which the diaphragm 55 operates may be varied by adjusting the tension of the spring 71 by screwing the plug 72 in or out, as will be readily understood.

It is desirable that the heating chamber and the cooling chamber each be kept at constant temperatures, and for this purpose they may be provided with suitable thermostatic governing devices. I prefer the well known "pneumatic" system, and in Fig. 1 I have shown such a system applied to my apparatus. 1$^a$ is a pipe extending from the conduit 50 to the thermostat 2$^a$, which latter is in a position to be heated by the steam in the jacket 4. When the temperature in the jacket changes, the thermostatic device is actuated, admitting compressed air to the pipe 3$^a$, to which are connected the diaphragm valves 4$^a$, 5$^a$, controlling the steam inlet and outlet pipes. The steam is thereby turned on or off, as the case may be. The cooling chamber is likewise provided with such devices, as a thermostat 6$^a$, controlling the flow of compressed air through the pipe 7$^a$, supplying air to operate the diaphragm valves 8$^a$, 9$^a$. The latter are shown connected with the ammonia supply and outlet pipes 14, 14$^a$, so that upon variation of temperature in the casing 13 the supply of cold water will be varied accordingly. The thermostat and valves controlled thereby may of course be connected with whatever cooling or heating system is used, as will be readily understood. The temperature in the chambers may be shown by thermometers, as 10$^a$, 11$^a$. The thermostatic devices mentioned are well known and therefore need not be described in detail.

Since steam for heating the compressed air may not always be available I have devised a simple gas heating apparatus which may be installed in lieu of the steam heating devices. This is shown in Fig. 6. The pipe 2 of the system shown in Fig. 1 communicates with a conical casing or chamber 73, which may be cut off at will by valves 74, 75. A suitable gas burner 76 is provided for heating the chamber 73, and is connected with a source of gas, not shown, by means of a pipe 77. In the latter is a valve 78, and a pressure actuated device 79 for operating the same which is in communication with the pipe 60'. It will thus be seen that simultaneously with the closing of pipe 2 and the cutting off of power to the compressor through the pipes 68, 69, the gas to the burner 76 will also be controlled, thereby avoiding waste of fuel when no air is flowing through the heating chamber 73. It will usually be found preferable to have the valve 78 merely reduce the amount of gas to the burner, so that a small flame will continue to burn. When the normal pressure of the air is restored and air again begins to flow through the heater 73 the opening of the valve 78 will then at once restore the flame, without the necessity of relighting the gas as would be the case if the valve 78 cut off the supply entirely. A by pass 80 is provided around the valve 78, to increase the supply of gas to the burner when for any reason that may be desirable during the time the valve 78 is closed. The gas supply may be entirely cut off by means of the valve 81 in the pipe 77. The conical heating chamber shown in Fig. 6 presents a large heating surface to the gas flame, and is therefore an economical form, but it will be understood that other forms may be used if desired.

My invention is well adapted for use with electric power, and in Fig. 7 such a system is shown. An electric compressor of any convenient type is indicated at 82, current being delivered thereto by wires 83, 84, controlled by a switch 85. A suitable electric heater is provided, shown diagrammatically at 86, which is supplied with current by wires 87, 88, through a switch 89. From the compressor the air passes through a pipe 90 to the heater 86, thence through a pipe 91 to the cooling apparatus, diagrammatically illustrated at 92. From the latter it is supplied by a pipe 93 to the point of utilization. In communication with the latter pipe is a pipe 94, which connects with the governors 95, 96, preferably of the type shown in Fig. 5. Connected with the governors are pressure actuated circuit breakers 97, 98, in the circuits 87, 88, and 83, 84 respectively. Fig. 8 shows a convenient circuit breaker which I have devised for that purpose, but other devices may be used if desired. When the compressed air is admitted by the governor through the pipe 99, upon the diaphragm 100 the latter is depressed against the adjustable spring 101, carrying the stem 102 downward and separating the contacts 103, 104. The latter are in the electrical circuit, as shown, and the current is thereby broken. Upon restoration of normal pressure the diaphragms are released and the contacts again brought together, thus closing the circuit and putting into operation the device actuated thereby. In this way the compressor and heater are controlled in the same way as in system shown in Figs. 1 and 6. The heater governor is set to close its circuit before the compressor circuit is closed, so that the heater will be at the proper temperature by the time the compressor again begins to deliver air thereto. Otherwise, if both circuits were closed simultaneously, the heater would be cold when the air began to flow through the same and more or less air would therefore pass unheated into the cooling chamber.

It will of course be understood that the apparatus herein specifically shown and described is merely typical of the invention, which may be embodied in a great variety of forms without departure from its proper scope.

What I claim is:

1. In an apparatus of the kind described, the combination with a source of compressed air or other gas, of a heating chamber, means for delivering the compressed air or other gas thereto, means for heating said chamber, a cooling chamber receiving the heated air or other gas from the heating chamber, and means for delivering the cooled air or other gas to the point of utilization, as set forth.

2. In an apparatus of the kind described, the combination with a source of compressed air or other gas, of a heating chamber, means for delivering the compressed air or other gas thereto, a steam jacket for the chamber to heat the same, a cooling chamber receiving the compressed air or other gas from the heating chamber, and means for delivering the cooled air or other gas to the point of utilization, as set forth.

3. In an apparatus of the kind described, the combination with a source of compressed air or other gas, of a heating chamber, a source of heat therefor, a cooling chamber, means for delivering the compressed gas from the heating chamber to the cooling chamber, automatic means for controlling the source of compressed gas and the source of heat when the pressure of the compressed gas varies from a predetermined limit, and means for delivering the compressed gas to the point of utilization, as set forth.

4. In an apparatus of the kind described, the combination with a source of compressed air or other gas, of a heating chamber, a source of heat therefor, a cooling chamber, means for delivering the compressed gas from the heating chamber to the cooling chamber, means for controlling the source of heat, means for controlling the source of compressed gas, both said controlling means being operated by the compressed gas in the system, automatic means for putting both said controlling means into operation when the pressure in the system varies from a predetermined limit, and means for delivering the compressed gas to the point of utilization, as set forth.

5. In an apparatus of the kind described, the combination with a source of compressed air or other gas, of a heating chamber, a source of heat therefor, a cooling chamber, means for delivering the compressed gas from the heating chamber to the cooling chamber, means for controlling the source of heat, means for controlling the source of compressed gas, both said controlling means being operated by the compressed gas in the system, a governor, actuated by the compressed gas in the system when the pressure therein varies from a predetermined limit, for putting both said controlling means into operation, and means for delivering the compressed gas to the point of utilization, as set forth.

JAMES R. DUNCAN.

Witnesses:
HENRY J. MULLEN.
W. C. FREDERICK.